United States Patent
Yu et al.

(10) Patent No.: US 10,922,140 B2
(45) Date of Patent: Feb. 16, 2021

(54) RESOURCE SCHEDULING SYSTEM AND METHOD UNDER GRAPHICS PROCESSING UNIT VIRTUALIZATION BASED ON INSTANT FEEDBACK OF APPLICATION EFFECT

(71) Applicant: SHANGHAI JIAO TONG UNIVERSITY, Shanghai (CN)

(72) Inventors: Miao Yu, Shanghai (CN); Zhengwei Qi, Shanghai (CN); Haibing Guan, Shanghai (CN); Yin Wang, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 572 days.

(21) Appl. No.: 15/563,951

(22) PCT Filed: Jun. 19, 2013

(86) PCT No.: PCT/CN2013/077457
§ 371 (c)(1),
(2) Date: Oct. 3, 2017

(87) PCT Pub. No.: WO2014/015725
PCT Pub. Date: Jan. 30, 2014

(65) Prior Publication Data
US 2018/0246770 A1    Aug. 30, 2018

(30) Foreign Application Priority Data

Jul. 26, 2012  (CN) .......................... 2012 1 0261862

(51) Int. Cl.
*G06F 9/50* (2006.01)
*G06F 9/455* (2018.01)
(Continued)

(52) U.S. Cl.
CPC .......... *G06F 9/5077* (2013.01); *G06F 9/3836* (2013.01); *G06F 9/45558* (2013.01);
(Continued)

(58) Field of Classification Search
None
See application file for complete search history.

(56) References Cited

U.S. PATENT DOCUMENTS 8,122,229 B2 *   2/2012   Wallach .............. G06F 9/30185
                                                                                     712/34
8,274,518 B2 *   9/2012   Blythe ................ G06F 9/45537
                                                                                     345/522
(Continued)

*Primary Examiner* — Abu Zar Ghaffari

(57) ABSTRACT

Physical Graphics Processing Unit (GPU) resource scheduling system and method between virtual machines are provided. An agent is inserted between a physical GPU instruction dispatch and a physical GPU interface through a hooking method, for delaying sending instructions and data in the physical GPU instruction dispatch to the physical GPU interface, monitoring a set of GPU conditions of a guest application executing in the virtual machine and a use condition of physical GPU hardware resources, and then providing a feedback to a GPU resource scheduling algorithm based on time or a time sequence. With the agent, it is unneeded for the method to make any modification to the guest application of the virtual machine, a host operating system, a virtual machine operating system, a GPU driver and a virtual machine manager.

15 Claims, 10 Drawing Sheets

(51) Int. Cl.
*G06F 9/38* (2018.01)
*G06F 9/48* (2006.01)
*G06T 1/20* (2006.01)
*G06F 9/30* (2018.01)
*G09G 5/36* (2006.01)

(52) U.S. Cl.
CPC .......... *G06F 9/4881* (2013.01); *G06F 9/5011* (2013.01); *G06T 1/20* (2013.01); *G06F 9/30072* (2013.01); *G06F 2009/45575* (2013.01); *G09G 5/363* (2013.01)

(56) References Cited

U.S. PATENT DOCUMENTS

| | | | |
|---|---|---|---|
| 8,341,624 B1* | 12/2012 | Hobbs | H04N 21/2662 718/1 |
| 8,669,990 B2* | 3/2014 | Sprangle | G06T 1/20 345/522 |
| 8,910,153 B2* | 12/2014 | Gupta | G06F 9/5077 718/1 |
| 2004/0160446 A1* | 8/2004 | Gosalia | G06F 9/5038 345/503 |
| 2007/0008324 A1* | 1/2007 | Green | G06T 1/00 345/501 |
| 2008/0303833 A1* | 12/2008 | Swift | G06T 15/005 345/505 |
| 2009/0109230 A1* | 4/2009 | Miller | G06F 1/3203 345/506 |
| 2010/0045682 A1* | 2/2010 | Ford | G06F 9/30181 345/502 |
| 2010/0110083 A1* | 5/2010 | Paltashev | G06F 9/30072 345/506 |
| 2011/0102443 A1* | 5/2011 | Dror | G06F 9/45558 345/522 |
| 2011/0296411 A1* | 12/2011 | Tang | G06F 9/45545 718/1 |
| 2012/0081355 A1* | 4/2012 | Post | G06T 15/005 345/419 |
| 2012/0084517 A1* | 4/2012 | Post | G06F 9/45541 711/153 |
| 2013/0057560 A1* | 3/2013 | Chakraborty | G06F 9/455 345/520 |
| 2013/0057563 A1* | 3/2013 | Persson | G06F 9/485 345/522 |
| 2013/0081039 A1* | 3/2013 | Glew | G06F 9/5011 718/103 |
| 2013/0181998 A1* | 7/2013 | Malakapalli | G06T 15/005 345/503 |
| 2015/0128136 A1* | 5/2015 | Rafique | G06F 9/5077 718/1 |

* cited by examiner

RESOURCE SCHEDULING SYSTEM AND METHOD UNDER GRAPHICS PROCESSING UNIT VIRTUALIZATION BASED ON INSTANT FEEDBACK OF APPLICATION EFFECT

CROSS REFERENCE OF RELATED APPLICATION

This is a U.S. National Stage under 35 U.S.C 371 of the International Application PCT/CN2013/077457, filed Jun. 19, 2013, which claims priority under 35 U.S.C. 119(a-d) to CN 201210261862.0, filed Jul. 26, 2012.

BACKGROUND OF THE PRESENT INVENTION

Field of Invention

The present invention relates to a system and a method applied to the technical field of computer application, especially a system and a method for physical Graphics Processing Unit (GPU) resource scheduling between virtual machines. More specifically, the present invention relates to a resource scheduling system under GPU virtualization.

Description of Related Arts

Graphics Processing Unit (GPU) virtualization technology is being widely used in data centers performing GPU computing. The GPU computing includes but is not limited to cloud gaming, video rendering and general purpose GPU computing.

However, now a kind of effective system and method for scheduling the physical GPU resources between the virtual machines is absent, which is able to make all guest applications running in parallel in multiple virtual machines gain a relatively good GPU acceleration effect while having a high resource utilization rate. The existing GPU Video Graphics Array (VGA) passthrough method endows each piece of usable physical GPU into each running virtual machine. However, the method has the following disadvantages. Firstly, a general commercial mainboard only supports two to three GPUs, therefore a specially-made mainboard is needed to simultaneously run multiple virtual machines needing GPU supporting. Secondly, in each virtual machine, during running, the owned physical GPU resources generally cannot be exhausted. For the GPU VGA passthrough method, the remaining GPU resources cannot be endowed to other virtual machines, resulting in physical GPU resources wasting.

Another method is to utilize GPU paravirtualization technology to make multiple virtual machines share one piece or multiple pieces of physical GPUs. In 2009, a thesis, *GPU Virtualization on VMware's Hosted I/O Architecture*, published in *SIGOPS Operating Systems Review*, Volume 43 Issue 3, came up with the method and system. Thereafter, in Graphic Engine Resource Management, Bautin M. et al. came up with a scheduling strategy to have physical GPU resources distributed evenly among multiple applications in *Multimedia Computing and Networking* in 2008. Then in Usenix ATC in 2011, Kato, et al. came up with the idea of upgrading the ability of the physical GPU to accelerate key user programs by introducing the GPU resource use priority and modifying the GPU driving method of the operating system in the thesis, *Timegraph: CPU Scheduling for Real-time Multi-tasking Environments*.

The above two methods can maximize the use of physical GPU resources and at the same time provide the GPU acceleration ability for multiple virtual machines. However, the methods have following disadvantages. On one hand, it is necessary to modify the operating system or the GPU driver, and when being applied to virtual machines, it is even necessary to modify the virtual machine hypervisor or the guest applications in the virtual machines. Therefore, a problem of a high development difficulty exists; on the other hand, as the available methods cannot obtain the accelerated guest application operation effect feedback data, the available system and method for scheduling physical GPU resources have blindness, and the obtained resource scheduling effect is common.

SUMMARY OF THE PRESENT INVENTION

In view of the above disadvantages in existing technology, the present invention provides a physical Graphic Processing Unit (GPU) resource scheduling system and method between virtual machines. According to the traditional GPU virtualization technology, GPU commands and data in a virtual machine are sent to a physical GPU interface of a host through a physical GPU instruction dispatch in the host. On basis of the traditional GPU virtualization technology, the method provided by the present invention adopts an agent inserted between the physical GPU instruction dispatch and the physical GPU interface through a hooking method, for delaying sending instructions and data in the physical GPU instruction dispatch, and monitoring a set of GPU conditions of a guest application executing in the virtual machine and a use condition of physical GPU hardware resources, and then providing a feedback to a GPU resource scheduling algorithm based on time or a time sequence. The GPU resource scheduling algorithm based on time or the time sequence means that starting, ending and continuation of a use of the physical GPU hardware resources are partially or wholly based on an absolute or relative time.

Besides, the system provided by the present invention accepts instantly a determination of users to start or stop using the agent through a scheduling controller, changes options and parameters of the used scheduling method and changes instantly corresponding parameter setups of the agent. At the same time, the scheduling controller displays or records one or more items of a scheduling and using condition of current physical GPU hardware resources, a use condition of guest application GPU resources in all virtual machines, etc.

The present invention adopts an advanced prediction technology; and with a cooperation of delaying sending the instructions and the data in the physical GPU instruction dispatch, a frame latency is accurately controlled. The advanced predicting technology comprises a frame rendering performance prediction, and a flush single queued frame, wherein: the flush single queued frame comprises a mark flush frame and a commit flush frame; the mark flush frame is optional, for marking one frame of the virtual machine in the queue (including but not limited to a previous frame or previous frames), wherein the marked frame is showed as a frame required to be removed from a buffer of a physical GPU (including but not limited to a force display); and the commit flush frame forces one frame (if the mark flush frame is executed, the frame corresponds to the marked frame) to be removed from the buffer of the physical GPU.

The system and method, provided by the present invention, have no need to change a host operating system, a host GPU driver, a hypervisor, a virtual machine operating system, a virtual machine GPU driver or the guest applications in virtual machine. Besides, the system and method provided by the present invention brings a performance cost less than 5% in operation with no significant virtual machine pause time (only millisecond class pause time necessary) resulting from starting or stopping use.

The present invention is realized through following technical schemes.

The present invention provides a resource scheduling system under GPU virtualization, comprising a physical GPU instruction dispatch, a physical GPU interface, an agent and a scheduling controller, which are all in a host; wherein:

the agent is connected between the physical GPU instruction dispatch and the physical GPU interface;

the scheduling controller is connected with the agent; and the scheduling controller receives user commands and delivers the user commands to the agent; the agent receives the user commands coming from the scheduling controller, monitors a set of GPU conditions of a guest application executing in a virtual machine, transmits GPU condition results of the guest application to the scheduling controller, calculates periodically or calculates on an event basis a minimum delay time necessary to meet the GPU conditions of the guest application according to a scheduling algorithm designated by the scheduling controller, and delays sending instructions and data in the physical GPU instruction dispatch to the physical GPU interface; and the scheduling controller receives, processes and displays scheduling results and scheduling conditions coming from the agent.

Preferably, the scheduling controller receives the user commands, analyzes operations to the agent, receives a configuration of the scheduling algorithm and corresponding parameters of the scheduling algorithm in the user commands, delivers the use commands to the agent, receives the GPU condition results of the guest application coming from the agent and displays to users.

Preferably, the scheduling controller comprises:

a control console, for receiving the user commands, wherein: the user commands input the configuration of the scheduling algorithm and the corresponding parameters of the scheduling algorithm, and for acquiring the scheduling results from a scheduling communicator and displaying to the users; and the scheduling communicator, responsible for a communication between the scheduling controller and one or more agents, loading/unloading the agent, delivering the user commands to the agent, and receiving the GPU condition results of the guest application coming from the agent.

Preferably, the agent comprises:

a scheduler, for receiving designations in the user commands about the configuration of the scheduling algorithm and the corresponding parameters of the scheduling algorithm, finding a storage position of the scheduling algorithm and loading the scheduling algorithm, configuring the scheduling algorithm and operating the scheduling algorithm, and delaying sending the instructions and the data in the physical GPU instruction dispatch to the physical GPU interface according to the calculated delay time; and a guest application GPU condition monitor, for collecting the GPU conditions of the guest application coming from the physical GPU interface, generating the GPU condition results of the guest application through the GPU conditions, feeding back the GPU condition results of the guest application to the scheduler and delivering the GPU conditions results to the scheduling communicator in the scheduling controller.

Preferably, the GPU conditions of the guest application comprises: measurements of GPU physical conditions and/or GPU logic conditions relevant to a guest application variety. The measurements of the GPU physical conditions comprise a GPU load, a temperature, and a voltage. For computer three-dimensional games, the measurements of the GPU logic conditions comprise frames per second (FPS); and for computer general purpose GPU operations, the measurements of the GPU logic conditions comprise operations per second (Ops), and a GPU load (application GPU usage) of the guest application.

According to the resource scheduling system described above, the present invention further provides a GPU resource scheduling method under the GPU virtualization. The agent is inserted between the physical GPU instruction dispatch and the physical GPU interface through a hooking method, for delaying sending the instructions and the data in the physical GPU instruction dispatch to the physical GPU interface, monitoring a set of GPU conditions of the guest application and a use condition of physical GPU hardware resources, and then providing a feedback to a GPU resource scheduling algorithm based on time or a time sequence. With the agent, it is unneeded for the GPU resource scheduling method to make any modification to the guest application of the virtual machine, a host operating system, a virtual machine operating system, a GPU driver, and a virtual machine manager, and a performance loss is low.

The GPU resource scheduling method under the GPU virtualization comprises steps of: starting one or more virtual machines; when a user needs to install the resource scheduling system, through means operated by the guest application, finding a process by the scheduling controller or designating a process by the user, and binding the agent to a corresponding virtual machine according to the process, wherein the process is a virtual machine image rendering process; then establishing a communication between the scheduling communicator in the scheduling controller and the bound agent; when scheduling physical GPU hardware resources, issuing an instruction, selecting the scheduling algorithm (can be a scheduling algorithm developed by a third party) and providing the corresponding parameters by the user; receiving the instruction from the user by the control console, and then sending the instruction to the agent by the scheduling communicator; according to the instruction, by the agent, configuring and operating the selected GPU resource scheduling algorithm, and delaying sending the instructions and the data in the physical GPU instruction dispatch to the physical GPU interface; at the same time, by the guest application GPU condition monitor, collecting the GPU conditions of the guest application coming from the physical GPU interface, generating GPU condition results of the guest application, then feeding back periodically or on the event basis the GPU condition results of the guest application to the scheduler, and delivering the GPU condition results to the scheduling communicator in the scheduling controller; when the user needs to unload the resource scheduling system, issuing an unloading instruction through the scheduling controller by the user; receiving the unloading instruction by the control console, sending the unloading instruction to the agent by the scheduling communicator, receiving the unloading instruction and stopping an operation of the agent by the agent.

Preferably, the GPU resource scheduling method adopts a GPU resource usage advanced prediction method. With a cooperation of delaying sending the instructions and the data in the physical GPU instruction dispatch, an accurate control of a frame latency is realized. The GPU resource usage advanced prediction method comprises a frame rendering performance prediction, and a flush single queued frame, wherein:

the frame rendering performance prediction comprises steps of: according to a historic record of a consumption time of the physical GPU hardware resources corresponding to the physical GPU interface, predicting a current consumption time of the physical GPU hardware resources; and the flush single queued frame comprises a mark flush frame and a commit flush frame; wherein the mark flush flame is optional, and comprise a step of: marking a frame (including but not limited to a previous frame or previous frames) of the virtual machine in the queue, wherein the marked frame is showed as a frame required to be removed from a buffer of a physical GPU (including but not limited to a forcing display of the frame); and the commit flush frame comprises a step of: forcing a frame to be removed from the buffer of the physical GPU, wherein the removed frame is the marked frame if the mark flush frame is executed.

Preferably, the step of "binding the agent to a corresponding virtual machine" comprises steps of:

Step 1.1, according to information of designations in the user instruction, finding designated virtual machine image rendering processes, wherein depending on different virtual machine manager designs, the processes are feasible to be a virtual machine process, or selecting all relevant virtual machine image rendering processes, and executing each virtual machine image rendering process with following Step 1.2 to Step 1.5;

Step 1.2, creating a thread in the process and loading the agent in the process;

Step 1.3, invoking a main function of the agent, and initializing the agent;

Step 1.4, finding an address set of the physical GPU interface loaded by the process, modifying a code at each address of the physical GPU interface, pointing the code to a corresponding handler in the agent and saving contents of all registers by the code, so that the process will run the handler each time when using the physical GPU interface in future; and Step 1.5, setting a return address of the handler as an old physical GPU interface address, running the instruction, and resuming the contents of all the registers, so that the handler is able to correctly execute the physical GPU interface after ending an operation of the handler.

Preferably, if using forecasting techniques, the step of "delaying sending the instructions and the data in the physical GPU instruction dispatch to the physical GPU interface" comprises steps of:

Step 2.1a, in the handler designated by the GPU resource scheduling algorithm, according to the historic record of the consumption time of the physical GPU hardware resources corresponding to the physical GPU interface, predicting the current consumption time of the physical GPU hardware resources, and stopping counting a current consumption time of a Central Processing Unit (CPU);

Step 2.2a, stopping an execution of the CPU for a period of time, wherein a length of the period of time is calculated by the scheduling algorithm according to the current consumption time of the CPU and the predicted current consumption time of the physical GPU hardware resources;

Step 2.3a, starting counting the current consumption time of the physical GPU hardware resources;

Step 2.4a, calling the physical GPU interface; and

Step 2.5a, stopping counting the current consumption time of the physical GPU hardware resources, and uploading the current consumption time of the physical GPU hardware resources to the historic record of the consumption time of the physical GPU hardware resources corresponding to the physical GPU interface.

Preferably, if no forecasting technique is used, the step of "delaying sending the instructions and the data in the physical GPU instruction dispatch to the physical GPU interface" comprises steps of:

Step 2.1b, in the handler designated by the GPU resource scheduling algorithm, stopping counting the current consumption time of the CPU and staring counting the current consumption time of the physical GPU hardware resources;

Step 2.2b, calling the physical GPU interface;

Step 2.3b, stopping counting the current consumption time of the physical GPU hardware resources; and Step 2.4b, stopping the execution of the CPU for a period of time, wherein a length of the period of time is calculated by the scheduling algorithm according to the current consumption time of the CPU and the current consumption time of the physical GPU hardware resources.

Preferably, if using the GPU resource usage advanced prediction method, the step of "delaying sending the instructions and the data in the physical GPU instruction dispatch to the physical GPU interface" comprises steps of:

Step 2.1c, in the handler designated by the GPU resource scheduling algorithm, proceeding the commit flush frame in the flush single queued frame; through the commit flush frame, forcing one frame to be removed, wherein if the mark flush frame is executed, the frame is the marked frame; and stopping counting the current consumption time of the CPU;

Step 2.2c, by the frame rendering performance prediction, according to the historic record of the consumption time of the physical GPU hardware resources corresponding to the physical GPU interface, predicting the current consumption time of the physical GPU hardware resources;

Step 2.3c, stopping the execution of the CPU for a period of time, wherein a length of the period of time is calculated by the scheduling algorithm according to the current consumption time of the CPU and the predicted current consumption time of the physical GPU hardware resources;

Step 2.4c, starting counting the current consumption time of the physical GPU hardware resources;

Step 2.5c, calling the physical GPU interface;

Step 2.6c, stopping counting the current consumption time of the physical GPU hardware resources; and Step 2.7c, starting counting a next consumption time of the CPU; executing the mark flush frame in the flush single queued frame, and marking one frame (including but not limited to a previous frame or previous frames) of the virtual machine in the queue by the mark flush frame, wherein the marked frame is showed as a frame required to be removed from the buffer (including but not limited to a forcing display of the frame); uploading the current consumption time of the physical GPU hardware resources to the historic record of the consumption time of the physical GPU hardware resources corresponding to the physical GPU interface.

Preferably, the step of collecting the GPU conditions of the guest application coming from the physical GPU interface by the guest application GPU condition monitor comprises steps of:

Step 3.1, in the handler designated by the GPU resource scheduling algorithm, calling the physical GPU interface, an operating system kernel or an interface provided by a GPU driver; and according to requirements of the GPU resource scheduling algorithm and the user commands, collecting the GPU conditions, such as the GPU load, the temperature, the voltage, the FPS, the Ops, and the GUP load of the guest application; and Step 3.2, in the handler designated by the GPU resource scheduling algorithm, calling the physical GPU interface.

Preferably, the step of "generating GPU condition results of the guest application" comprises steps of:

Step 4.1, designating a condition reporting frequency by the user, and acquiring the condition reporting frequency in the agent;

Step 4.2, when reaching a predetermined condition reporting point, by the guest application GPU condition monitor in the agent, sending accumulative GPU condition results of the guest application to the scheduling communicator in the scheduling controller; and Step 4.3, emptying a GPU condition result buffer of the agent by the agent.

Preferably, the step of "receiving the unloading instruction and stopping an operation of the agent by the agent" comprises steps of:

Step 5.1, after receiving the unloading instruction by the agent, executing following Step 5.2 to Step 5.3 by each agent;

Step 5.2, resuming the address set of the physical GPU interface loaded by the process, and modifying the code at each address of the physical GPU interface to original contents at the address of the physical GPU interface, so that the process will run an original logic of the physical GPU interface each time when using the physical GPU interface in future; and Step 5.3, ending the thread inserted into the process of binding the agent to the corresponding virtual machine, and unloading the agent.

Preferably, the GPU resource scheduling algorithm comprises following steps of:

Step 6.1, for a group of virtual machines VM1, VM2 . . . to VMn, analyzing a user method configuration by the scheduler in the agent, and obtaining a minimum GPU load, minimum frames per second to be met (an application scope of the present invention is not limited to computer games, and for other GPU applications, measurements for different conditions are feasible), and a testing period T designated by the user;

Step 6.2, during operation, calling the handler multiple times; and for each call of the handler, executing Step 2.1a to Step 2.5a with the forecasting techniques; or executing Step 2.1b to Step 2.4b without the forecasting techniques;

Step 6.3, for each testing period T, if a virtual machine VMm does not satisfy a condition measurement, finding and reducing a setting of minimum frames per second of a virtual machine having maximum and minimum frames per second, wherein a reduced magnitude of the frames per second is determined by an application GPU load of the guest application for recent frames; and the frames per second and the application GPU load for the recent frames have a linear relation;

Step 6.4, for each testing period T, if a utilization rate of the physical GPU fails to meet the minimum GPU load, increasing a setting of the minimum frames per second for all of the virtual machines; wherein an increased magnitude of the frames per second is determined by the application GPU load of the guest application for the recent frames, and the frames per second and the application GPU load of the guest application for the recent frames have the linear relation; and Step 6.5, keep running Step 6.2 to Step 6.4 until the method designated by the user ends or the method is changed or the agent is unloaded.

According to the present invention, one agent is installed in the physical GPU instruction dispatch corresponding to each virtual machine, and the agent is owned independently by the physical GPU instruction dispatch. The only scheduling controller available globally is connected with one or more agents. Compared with the prior art, the present invention has following advantages. Firstly, it is unneeded to make any modification to the guest application of the virtual machine, the host operating system, the operating system of the virtual machine, the GPU driver and the virtual machine manager. The existing systems usually need to modify one of the above items in a great deal to realize a similar scheduling ability. Such modification may cause the existing system to evolve continuously to be compatible with the latest guest application, the operating system, the GPU driver, etc. Secondly, according to the present invention, it is unnecessary to stop the machine operation temporarily in installation or unloading, which enables the system to be deployed in the commercial system easily, and makes the system particularly applicable to a commercial server that can be used for 7×24 hours. Finally, when upgrading the GPU resource scheduling ability between the virtual machines, the present invention has a high performance, with a general performance loss being less than 5%.

These and other objectives, features, and advantages of the present invention will become apparent from the following detailed description, the accompanying drawings, and the appended claims.

DETAILED DESCRIPTION OF THE PREFERRED EMBODIMENT

A preferred embodiment of the present invention is illustrated in detail as follows. The preferred embodiment is implemented under the prerequisite of the technical scheme of the present invention and gives a detailed embodiment mode and the specific operation process, but the protection scope of the present invention is not limited to the following preferred embodiment.

Figure 2:
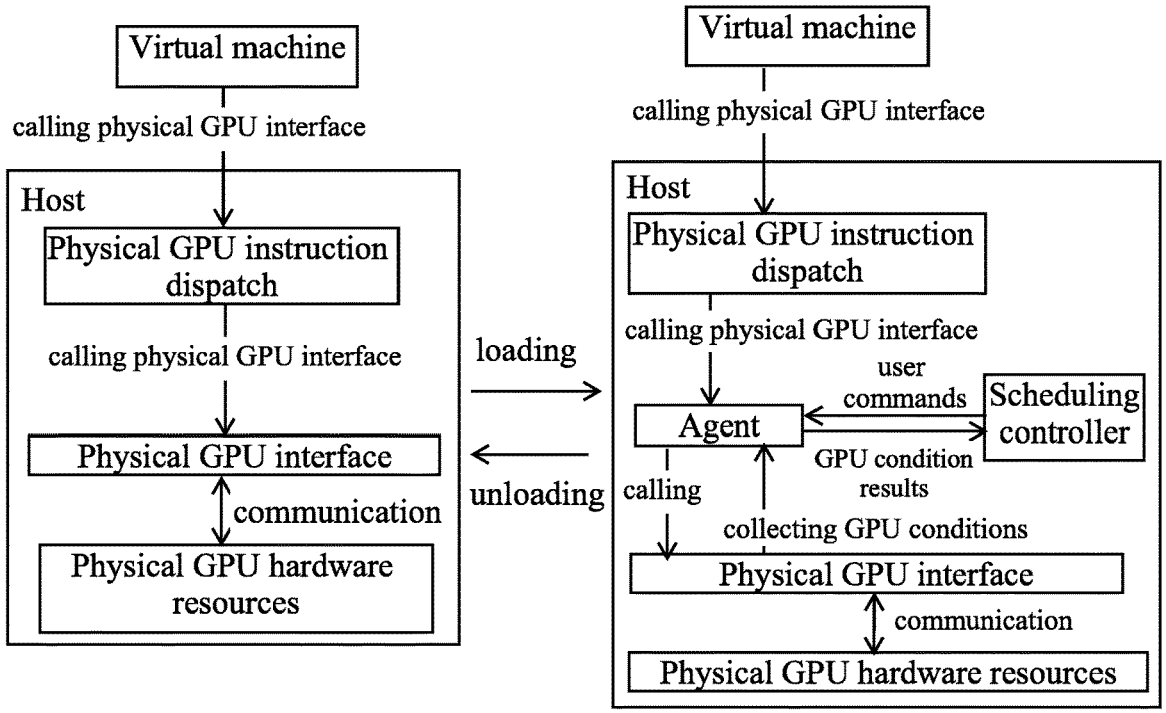
FIG. 2 is a framework schematic diagram of the resource scheduling system according to the preferred embodiment of the present invention.

According to a preferred embodiment of the present invention, as shown in FIG. 2, the present invention provides a resource scheduling system under Graphics Processing Unit (GPU) virtualization, comprising an agent and a scheduling controller; wherein: the scheduling controller is connected with the agent, for sending user commands to the agent and receiving GPU condition results returned from the agent; the agent is inserted between a physical GPU instruction dispatch and a physical GPU interface, for delaying corresponding data transmission and interface calling; and, the agent is responsible for utilizing the physical GPU interface to collect measurements of GPU physical conditions and/or GPU logic conditions of a guest application executing in a virtual machine. The preferred embodiment is aimed at computer games operating in virtual machines, therefore the collected GPU physical condition and GPU logic condition comprise an application GPU load and frames per second (FPS).

Figure 1:
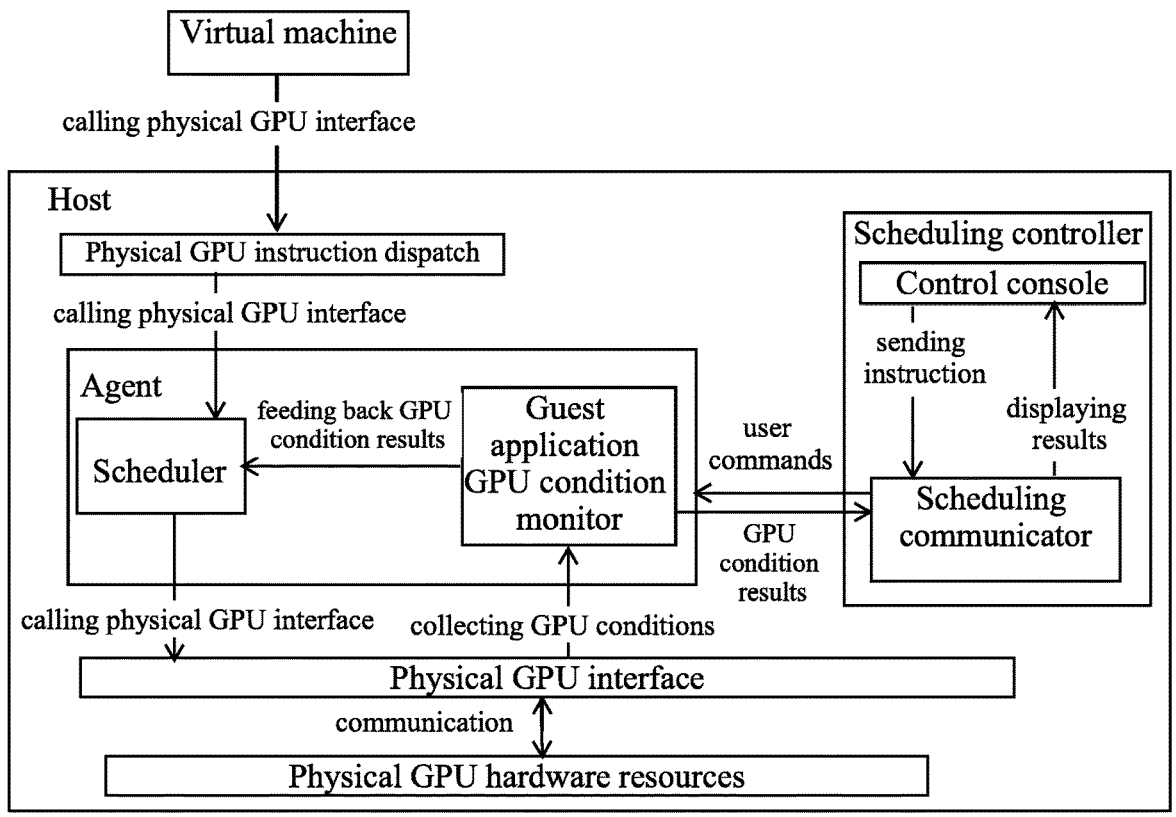
FIG. 1 is a module schematic diagram of a resource scheduling system under Graphics Processing Unit (GPU) virtualization according to a preferred embodiment of the present invention.

As shown in FIG. 1, the scheduling controller comprises a control console, and a scheduling communicator, wherein: the control console is for receiving the user commands; the user commands input a configuration about a scheduling algorithm and corresponding parameters of the scheduling algorithm; the control console obtains, periodically/on an event basis, scheduling results from the scheduling communicator and displays to a user; the scheduling communicator is responsible for a communication between the scheduling controller and one or more agent, and responsible for such operations as installing/unloading the agent, and delivering the user commands to the agent; the event basis means one or more occurrences of a target event, but an occurrence time interval is not constant; and an event distribution in respect of time can be mathematically expressed as a time sequence of non-periodic nature.

As shown in FIG. 1, the agent comprises a scheduler and a guest application GPU condition monitor; wherein: the scheduler is for receiving designations in the user commands about the configuration of the scheduling algorithm and the corresponding parameters of the scheduling algorithm, and is responsible for running the corresponding scheduling algorithm according to the configuration, and delaying sending instructions and data in the physical GPU instruction dispatch to the physical GPU interface according to requirements; the guest application GPU condition monitor is responsible for collecting GPU conditions coming from the physical GPU interface, thereby generating GPU condition results of the guest application, then feeding back periodically/on the event basis the GPU condition results of the guest application to the scheduler, and delivering the GPU condition results to the scheduling communicator in the scheduling controller.

The GPU conditions of the guest application refer to the measurements of GPU physical conditions and/or GPU logic conditions relevant to a guest application variety. According to the preferred embodiment, the collected GPU physical condition and GPU logic condition comprise the application GPU load and the FPS.

The preferred embodiment is aimed at a VMWare Player 4.0 virtual machine manager system, and therefore a virtual machine image rendering process, namely a virtual machine process, is designated. According to the preferred embodiment, only a circumstance that a user selects all relevant virtual machine image rendering processes is considered.

Figure 3:
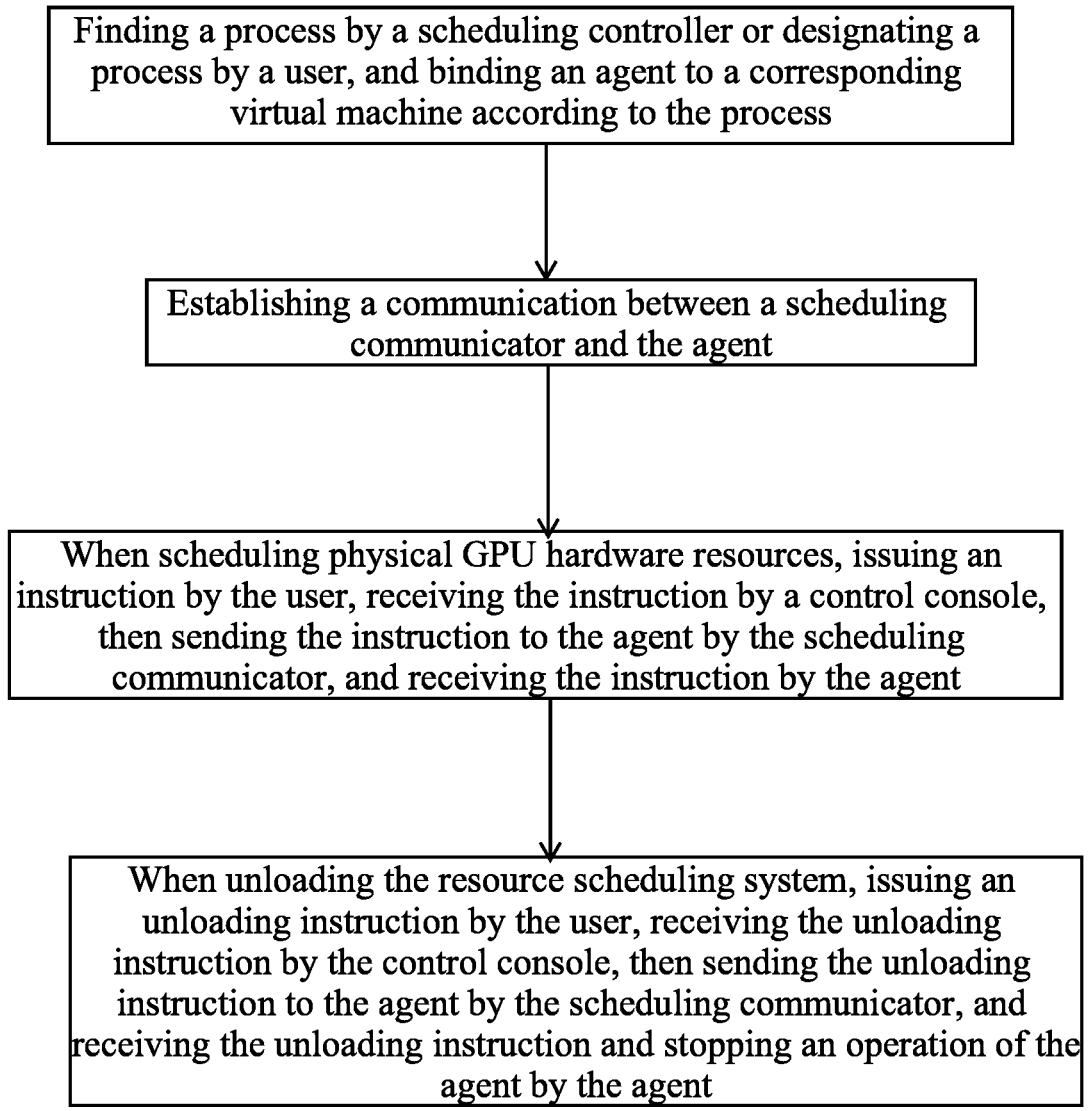
FIG. 3 is a sketch view of a resource scheduling method according to the preferred embodiment of the present invention.

According to the preferred embodiment, an applied resource scheduling method under the GPU virtualization is configured as: a minimum GPU load=80%, minimum FPS=30 and a testing period T, designated by user, T=1 s. FIG. 3 shows a sketch view of the resource scheduling method.

Figure 4:
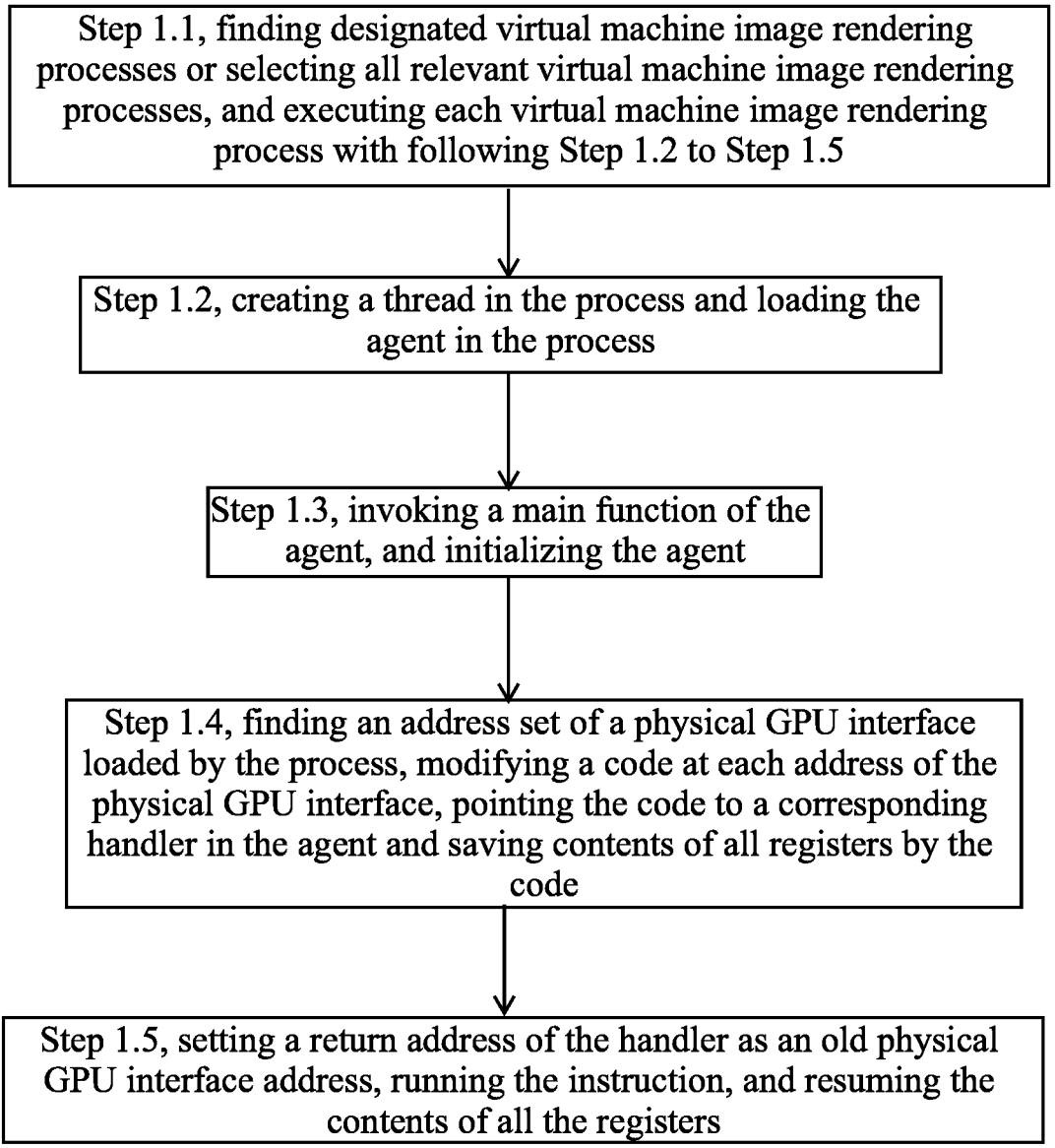
FIG. 4 is a sketch view of binding an agent to a corresponding virtual machine according to the preferred embodiment of the present invention.
Figure 5:
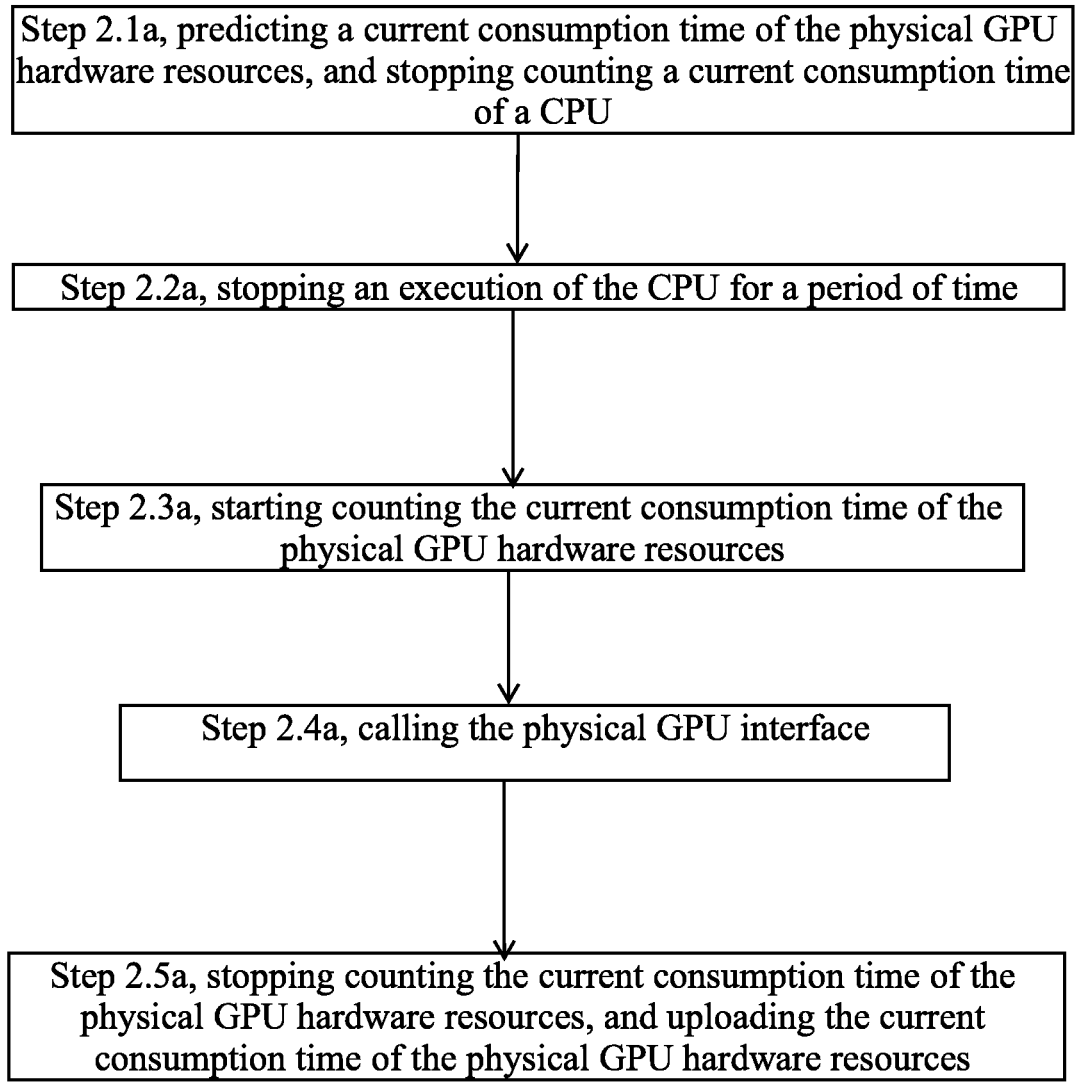
FIG. 5 is a sketch view of delaying sending instructions and data in a physical GPU instruction dispatch to a physical GPU interface with forecasting techniques according to the present invention.
Figure 6:
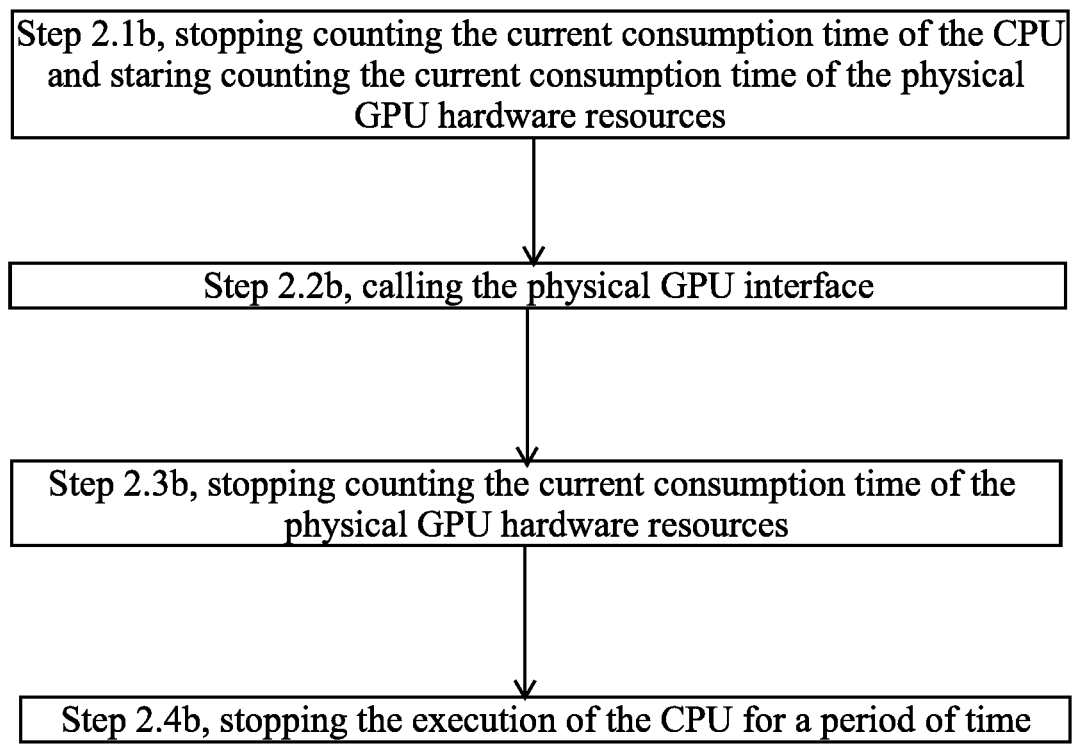
FIG. 6 is a sketch view of delaying sending the instructions and the data in the physical GPU instruction dispatch to the physical GPU interface without the forecasting techniques according to the present invention.
Figure 7:
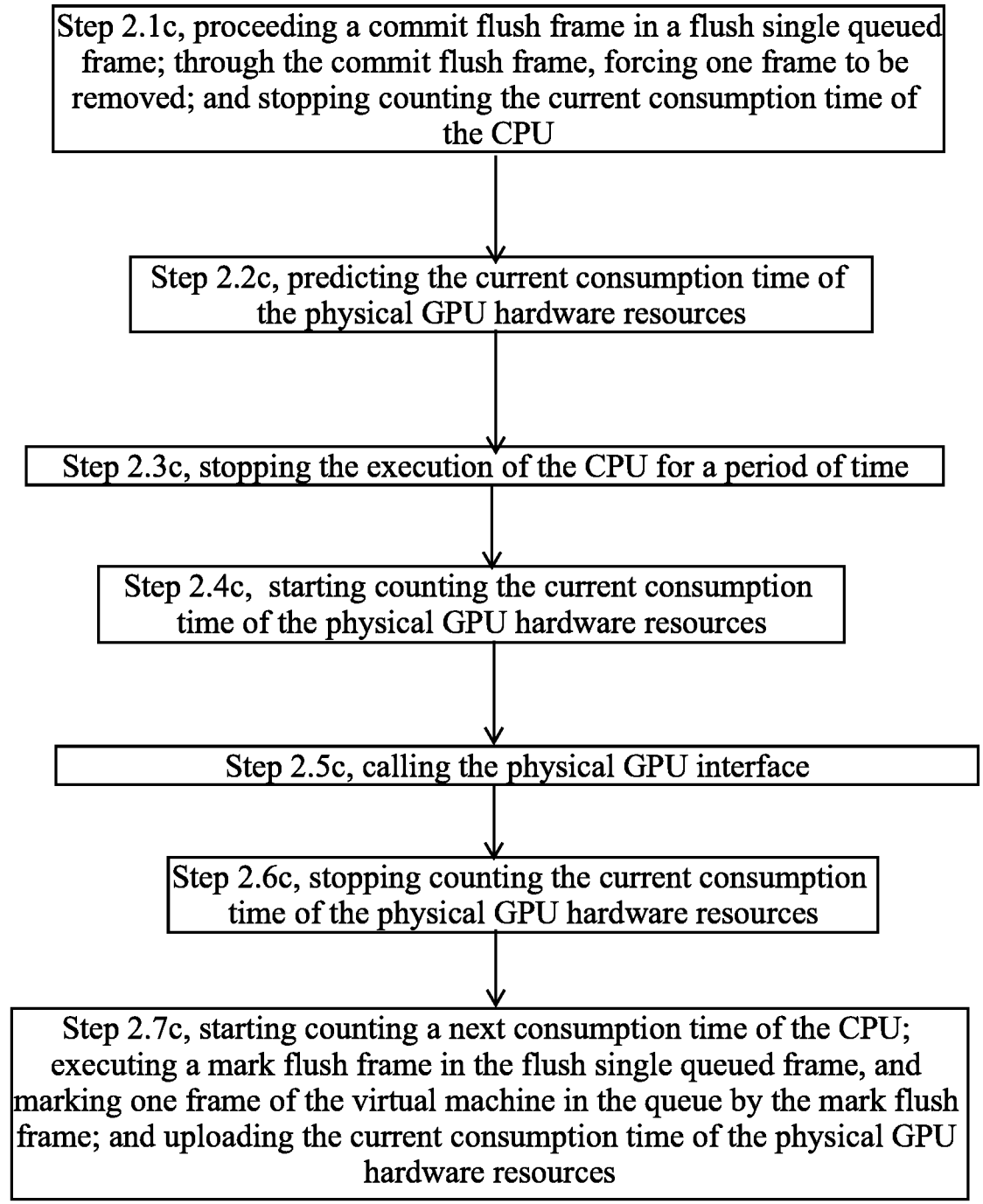
FIG. 7 is a sketch view of delaying sending the instructions and the data in the physical GPU instruction dispatch to the physical GPU interface with a GPU resource usage advanced prediction method according to the present invention.
Figure 8:
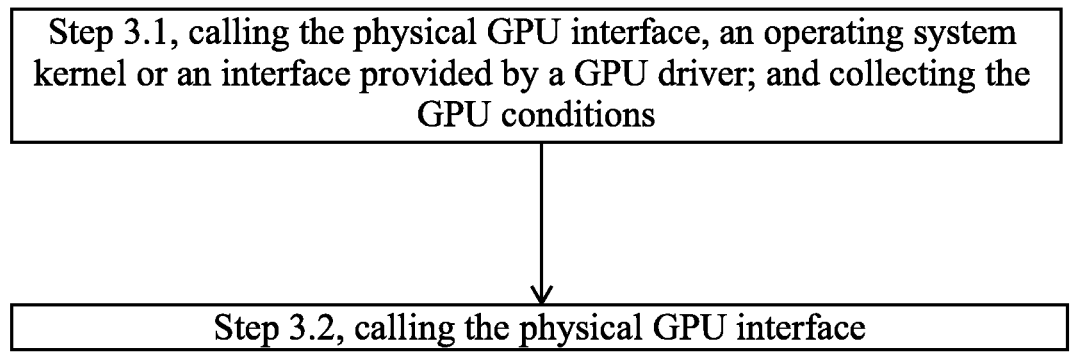
FIG. 8 is a sketch view of collecting GPU conditions according to the present invention.
Figure 9:
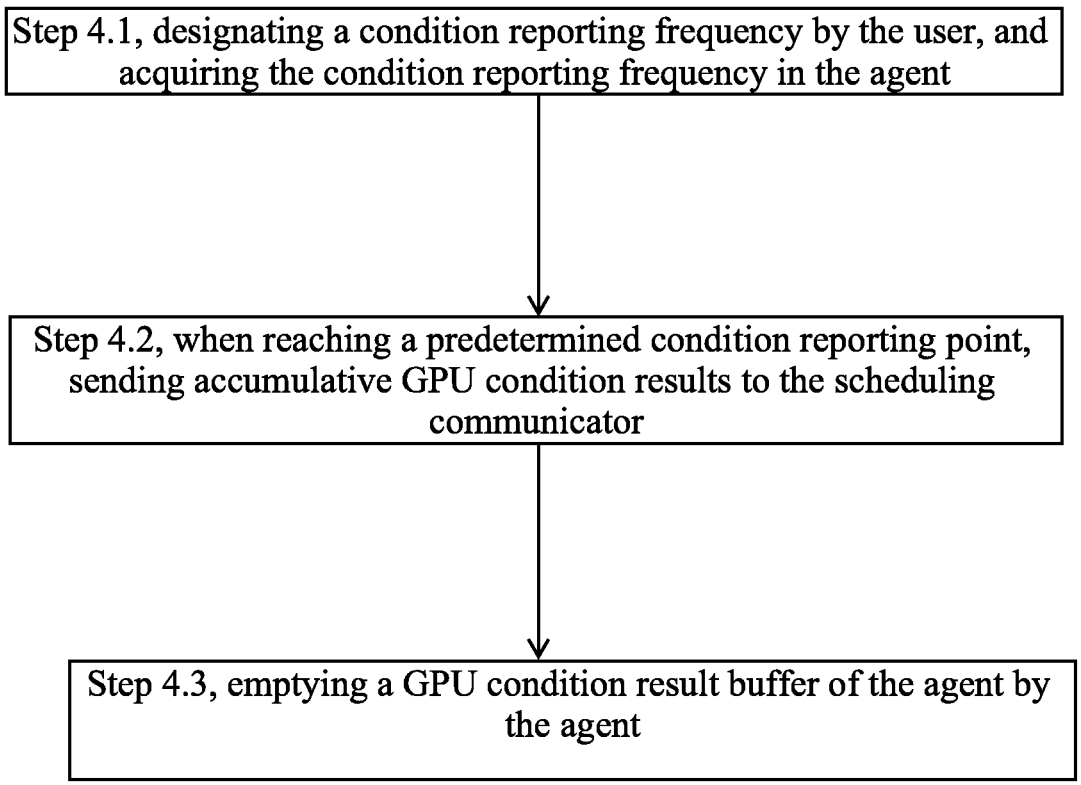
FIG. 9 is a sketch view of generating GPU condition results according to the present invention.
Figure 10:
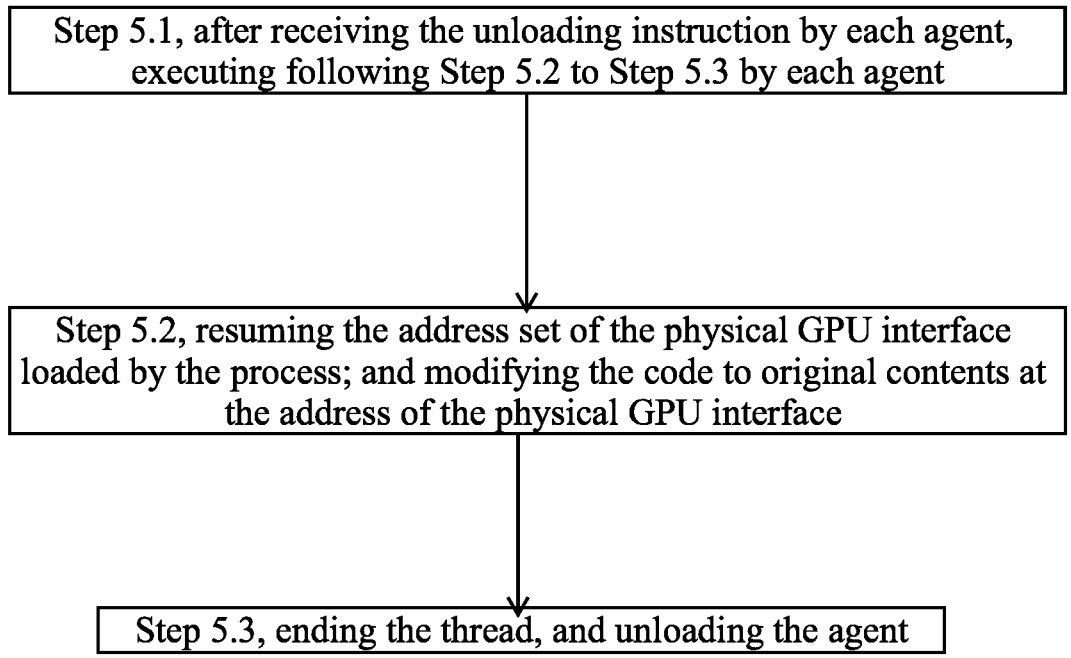
FIG. 10 is a sketch view of receiving an unloading instruction and stopping an operation of the agent by the agent according to the present invention.
Figure 11:
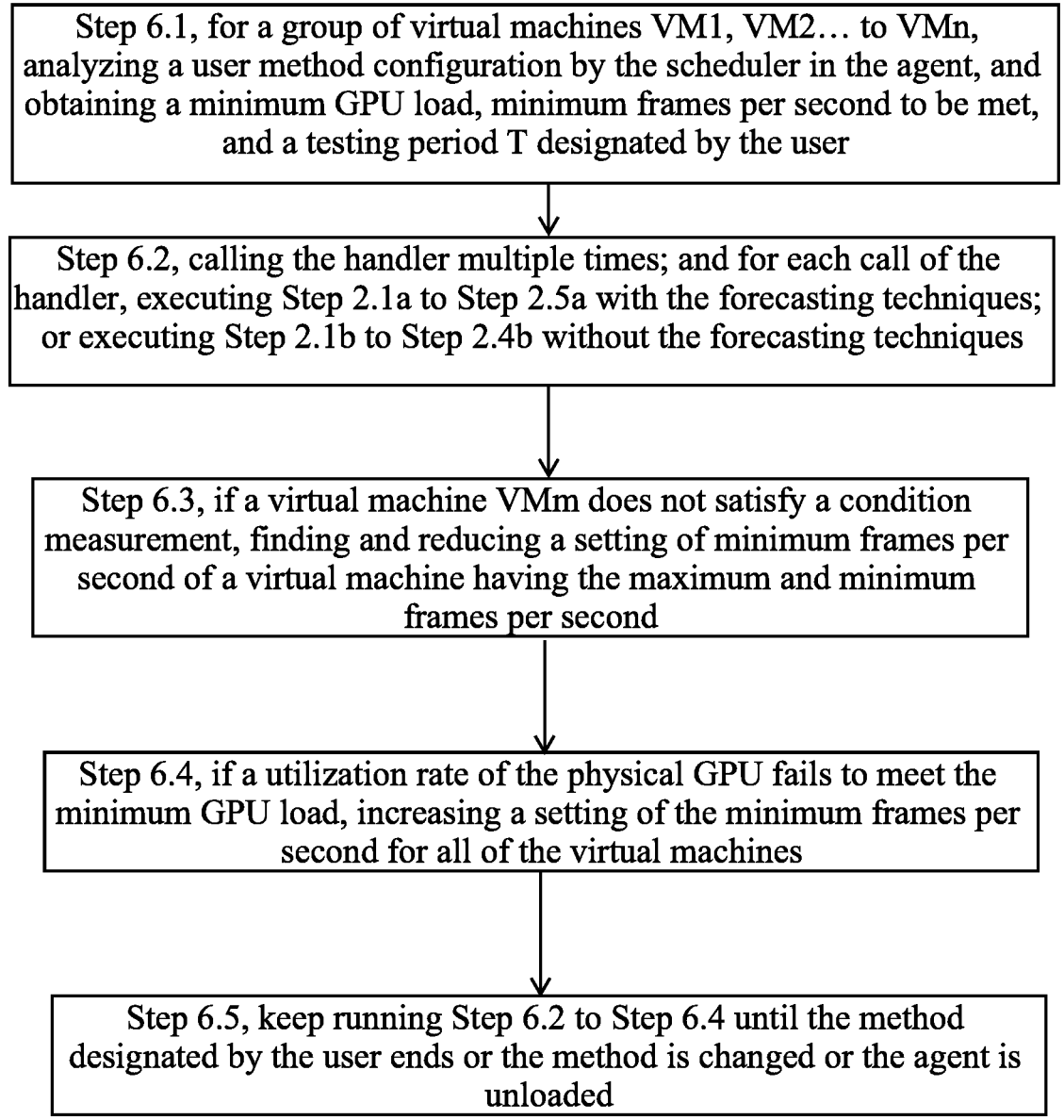
FIG. 11 is a sketch view of a GPU resource scheduling algorithm according to the present invention.

As shown in FIG. 4, the present invention works through following steps of:

Step I, selecting all relevant virtual machine processes by the user, and executing each virtual machine process with Step II to Step V;

Step II, creating a thread in the process, and loading the agent in the process;

Step III, invoking a main function of the agent, and initializing the agent;

Step IV, finding an address set of the physical GPU interface loaded by the process, modifying a code at each address of the physical GPU interface, pointing the code to a corresponding handler in the agent and saving contents of all registers by the code, so that the process will run the handler each time when using the physical GPU interface in future; and Step V, setting a return address of the handler as an old physical GPU interface address, running the instruction, and resuming the contents of all the registers, so that the handler is able to correctly execute the physical GPU interface after ending an operation of the handler.

Through the above steps, the agent is bound to the corresponding virtual machine. After establishing the communication between the scheduling communicator in the scheduling controller and the bound agent, the agent is able to send the GPU condition results to the scheduling controller and respond to the user commands issued by the scheduling controller. When it is necessary to schedule physical GPU hardware resources at some point thereafter, the present invention executes following steps of:

Step 1, for a group of virtual machines VM1, VM2 . . . to VMn, analyzing a user algorithm configuration by the scheduler in the agent, and obtaining the minimum GPU load=80%, the minimum FPS=30 to be met, and the testing period T, designated by the user, T=1 s;

Step 2, during operation, calling the handler multiple times for collecting the GPU conditions and delaying sending the instructions and the data in the physical GPU instruction dispatch to the physical GPU interface; and for each call of the handler, executing Step 2.1 to Step 2.6;

Step 2.1, in the handler designated by a GPU resource scheduling algorithm, predicting a current consumption time of the GPU according to a historic record of a consumption time of the GPU corresponding to the physical GPU interface;

Step 2.2, utilizing the physical GPU interface and a GPU driver interface, measuring a current application GPU load and current FPS within a current t time; and stopping counting a current consumption time of a Central Processing Unit (CPU);

Step 2.3, stopping an execution the CPU for a period of time, wherein a length of the period of time is calculated by the scheduling algorithm according to the current consumption time of the CPU and the predicted current consumption time of the GPU Step 2.4, starting counting the current consumption time of the GPU;

Step 2.5, calling the physical GPU interface; and

Step 2.6, stopping counting the current consumption time of the GPU, and updating to the historic record of the consumption time of the GPU corresponding to the physical GPU interface;

Step 3, for each testing period T, if a virtual machine VMm does not satisfy the minimum FPS, finding and reducing a setting of minimum frames per second of a virtual machine having the maximum and minimum FPS; wherein a reduced magnitude of the FPS depends on an application GPU load for recent frames, and the FPS and the application GPU load for the recent frames have a linear relation;

Step 4, for each testing period T, if a utilization rate of the physical GPU fails to meet the minimum GPU load, increasing a setting of the minimum FPS for all of the virtual machines; wherein an increased magnitude of the FPS depends on the application GPU load for the recent frames, and the FPS and the application GPU load for the recent frames have the linear relation; and Step 5, keep running Step 2 to Step 4 until the algorithm designated by the user ends or the algorithm is changed or the agent is unloaded.

According to the preferred embodiment of the present invention, the agent is unloaded through following steps of:

Step a, receiving an unloading instruction by the agent, and starting an unloading process by the agent from Step b to Step c;

Step b, resuming the address set of the physical GPU interface loaded by the process, and modifying the code at each address of the physical GPU interface to original contents at the address of the GPU physical address, so that the process will run an original logic of the physical GPU interface each time when using the physical GPU interface in future; and Step c, ending the thread inserted in the process of binding the agent to the corresponding virtual machine, and unloading the agent.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A resource scheduling system in a virtualized environment, comprising a physical GPU instruction dispatch, a physical GPU interface, an agent and a scheduling controller, which are all in a host wherein:

the agent is connected between the physical GPU instruction dispatch and the physical GPU interface;

the scheduling controller is connected with the agent, and the scheduling controller receives user commands, and delivers the user commands to the agent; the agent receives the user commands coming from the scheduling controller, monitors a set of GPU conditions of a guest application executing in a virtual machine, transmits GPU condition results of the guest application to the scheduling controller, calculates periodically/on an event basis a minimum delay time necessary to meet the GPU conditions of the guest application according to a scheduling algorithm designated by the scheduling controller, and delays sending instructions and data in the physical GPU instruction dispatch to the physical GPU interface; and the scheduling controller receives a scheduling result and a scheduling condition coming from the agent, processes the scheduling result and the scheduling condition, and displays the processed scheduling result and scheduling condition.

2. The resource scheduling system, as recited in claim 1, wherein: the scheduling controller is for receiving the user commands, analyzing an operation of the agent, receiving a configuration of the scheduling algorithm and corresponding parameters of the scheduling algorithm in the user commands, delivering the user commands to the agent, receiving the GPU condition results of the guest application coming from the agent and displaying to a user.

3. The resource scheduling system, as recited in claim 2, wherein the scheduling controller comprises:

a control console, for receiving the user commands, wherein the user commands input the configuration of the scheduling algorithm and the corresponding parameters of the scheduling algorithm, and for acquiring the scheduling result from a scheduling communicator and displaying to the user; and the scheduling communicator, responsible for a communication between the scheduling controller and one or more agents, loading/unloading the agent, delivering the user commands to the agent, and receiving the GPU condition results of the guest application coming from the agent.

4. The resource scheduling system, as recited in claim 3, wherein the agent comprises:

a scheduler, for receiving designations in the user commands about the configuration of the scheduling algorithm and the corresponding parameters of the scheduling algorithm, finding a storage position of the scheduling algorithm and loading the scheduling algorithm, configuring the scheduling algorithm and operating the scheduling algorithm, and delaying sending the instructions and the data in the physical GPU instruction dispatch to the physical GPU interface according to the calculated delay time; and a guest application GPU condition monitor, for collecting the GPU conditions of the guest application coming from the physical GPU interface, generating the GPU condition results of the guest application through the GPU conditions, feeding back the GPU condition results of the guest application to the scheduler and delivering the GPU condition results to the scheduling communicator in the scheduling controller.

5. The resource scheduling system, as recited in claim 4, wherein the GPU conditions of the guest application comprises measurements of GPU physical conditions and/or GPU logic conditions relevant to a guest application variety.

6. A resource scheduling method in a virtualized environment with a resource scheduling system comprising a physical GPU instruction dispatch, a physical GPU interface, an agent and a scheduling controller, wherein: the physical GPU instruction dispatch, the physical GPU interface, the agent and the scheduling controller are all in a host; the scheduling controller is connected with the agent; the agent is inserted between the physical GPU instruction dispatch and the physical GPU interface through a hooking method, for delaying sending instructions and data in the physical GPU instruction dispatch to the physical GPU interface, monitoring a set of GPU conditions of a guest application executing in a virtual machine and a use condition of physical GPU hardware resources, and then providing a feedback to a GPU resource scheduling algorithm based on time or a time sequence;

the resource scheduling method comprises steps of:

starting one or more virtual machines; when a user needs to load the resource scheduling system, through means operated by the guest application, finding a process by the scheduling controller or designating a process by the user, and binding the agent to a corresponding virtual machine according to the process, wherein the process is a virtual machine image rendering process;

establishing a communication between a scheduling communicator in the scheduling controller and the agent;

when scheduling the physical GPU hardware resources, issuing an instruction, selecting the scheduling algorithm and providing corresponding parameters of the scheduling algorithm by the user; after receiving the instruction from the user by a control console of the scheduling controller, sending the instruction to the agent by the scheduling communicator;

according to the instruction, by the agent, configuring and operating the selected GPU resource scheduling algorithm, and delaying sending the instructions and the data in the physical GPU instruction dispatch to the physical GPU interface;

at the same time, by a guest application GPU condition monitor of the agent, collecting the GPU conditions of the guest application coming from the physical GPU interface, generating GPU condition results of the guest application, then feeding back periodically or on an event basis the GPU condition results of the guest application to a scheduler of the agent, and delivering the GPU condition results to the scheduling communicator in the scheduling controller;

when the user needs to unload the resource scheduling system, issuing an unloading instruction through the scheduling controller by the user; receiving the unloading instruction by the control console, sending the unloading instruction to the agent by the scheduling communicator, and receiving the unloading instruction and stopping an operation of the agent by the agent.

7. The method as recited in claim 6, wherein the resource scheduling method adopts a GPU resource usage advanced prediction method; with a cooperation of delaying sending the instructions and the data in the physical GPU instruction dispatch, a control of a frame latency is achieved; the GPU resource usage advanced prediction method comprises a frame rendering performance prediction, and a flush single queued frame, wherein:

the frame rendering performance prediction comprises steps of: according to a historic record of a consumption time of the physical GPU hardware resources corresponding to the physical GPU interface, predicting a current consumption time of the physical GPU hardware resources; and the flush single queued frame comprises a mark flush frame and a commit flush frame; wherein the mark flush frame is optional, and comprise a step of: marking a frame of the virtual machine in a queue, wherein the marked frame is showed as a frame required to be removed from a buffer of a physical GPU; and the commit flush frame comprises a step of: forcing one frame to be removed from the buffer of the physical GPU.

8. The method, as recited in claim 7, wherein: the step of "binding the agent to a corresponding virtual machine" comprises steps of:

Step 1.1: according to information of designations in the user instruction, finding designated virtual machine image rendering processes, or all relevant virtual machine image rendering processes, and executing each virtual machine image rendering process with following Step 1.2 to Step 1.5;

Step 1.2: creating a thread in the process and loading the agent in the process;

Step 1.3: invoking a main function of the agent, and initializing which initializes the agent;

Step 1.4: finding an address set of the physical GPU interface loaded by the process, modifying a code at each address of the physical GPU interface, pointing the code to a corresponding handler in the agent and saving contents of all registers by the code, so that the process will run the handler each time when using the physical GPU interface in future; and Step 1.5: setting a return address of the handler as a previous physical GPU interface address, running the instruction, and resuming the contents of all the registers, so that the handler correctly executes the physical GPU interface after ending an operation of the handler.

9. The method, as recited in claim 7, wherein:

if using forecasting techniques, the step of "delaying sending the instructions and the data in the physical GPU instruction dispatch to the physical GPU interface" comprises steps of:

Step 2.1a: in a handler designated by the GPU resource scheduling algorithm, according to the historic record of the consumption time of the physical GPU hardware resources corresponding to the physical GPU interface, predicting the current consumption time of the physical GPU hardware resources, and stopping counting a current consumption time of a Central Processing Unit (CPU);

Step 2.2a: stopping an execution of the CPU for a period of time, wherein a length of the period of time is calculated by the scheduling algorithm according to the current consumption time of the CPU and the predicted current consumption time of the physical GPU hardware resources;

Step 2.3a: starting counting the current consumption time of the physical GPU hardware resources;

Step 2.4a: calling the physical GPU interface; and

Step 2.5a: stopping counting the current consumption time of the physical GPU hardware resources, and uploading the current consumption time of the physical GPU hardware resources to the historic record of the consumption time of the physical GPU hardware resources corresponding to the physical GPU interface;

if no forecasting techniques is used, the step of "delaying sending the instructions and the data in the physical GPU instruction dispatch to the physical GPU interface" comprises steps of:

Step 2.1b: in the handler designated by the GPU resource scheduling algorithm, stopping counting the current consumption time of the CPU and staring counting the current consumption time of the physical GPU hardware resources;

Step 2.2b: calling the physical GPU interface;

Step 2.3b: stopping counting the current consumption time of the physical GPU hardware resources; and Step 2.4b: stopping the execution of the CPU for a period of time, wherein a length of the period of time is calculated by the scheduling algorithm according to the current consumption time of the CPU and the current consumption time of the physical GPU hardware resources;

if using the GPU resource usage advanced prediction method, the step of "delaying sending the instructions and the data in the physical GPU instruction dispatch to the physical GPU interface" comprises steps of:

Step 2.1c: in the handler designated by the GPU resource scheduling algorithm, proceeding the commit flush frame in the flush single queued frame; through the commit flush frame, forcing one frame to be removed, wherein if the mark flush frame is executed, the frame is the marked frame; and stopping counting the current consumption time of the CPU;

Step 2.2c: by the frame rendering performance prediction, according to the historic record of the consumption time of the physical GPU hardware resources corresponding to the physical GPU interface, predicting the current consumption time of the physical GPU hardware resources;

Step 2.3c: stopping the execution of the CPU for a period of time, wherein a length of the period of time is calculated by the scheduling algorithm according to the current consumption time of the CPU and the predicted current consumption time of the physical GPU hardware resources;

Step 2.4c: starting counting the current consumption time of the physical GPU hardware resources;

Step 2.5c: calling the physical GPU interface;

Step 2.6c: stopping counting the current consumption time of the physical GPU hardware resources; and Step 2.7c: starting counting a next consumption time of the CPU; executing the mark flush frame in the flush single queued frame, and marking one frame of the virtual machine in the queue by the mark flush frame, wherein the marked frame is showed as a frame required to be removed from the buffer; and uploading the current consumption time of the physical GPU hardware resources to the historic record of the consumption time of the physical GPU hardware resources corresponding to the physical GPU interface.

10. The method, as recited in claim 6, wherein: the step of "binding the agent to a corresponding virtual machine" comprises steps of:

Step 1.1: according to information of designations in the user instruction, finding designated virtual machine image rendering processes, or selecting all relevant virtual machine image rendering processes, and executing each virtual machine image rendering process with following Step 1.2 to Step 1.5;

Step 1.2: creating a thread in the process and loading the agent in the process;

Step 1.3: invoking a main function of the agent, which initializes the agent;

Step 1.4: finding an address set of the physical GPU interface loaded by the process, modifying a code at each address of the physical GPU interface, pointing the code to a corresponding handler in the agent and saving contents of all registers by the code, so that the process will run the handler each time when using the physical GPU interface in future; and Step 1.5: setting a return address of the handler as a previous physical GPU interface address, running the instruction, and resuming the contents of all the registers, so that the handler correctly executes the physical GPU interface after ending an operation of the handler.

11. The method, as recited in claim 10, wherein the step of "receiving the unloading instruction and stopping an operation of the agent by the agent" comprises steps of:

Step 5.1: after receiving the unloading instruction by each agent, executing following Step 5.2 to Step 5.3 by each agent;

Step 5.2: resuming the code at the address set of the physical GPU interface loaded by the process, and modifying the code at each address of the physical GPU interface to original contents at the address of the physical GPU interface, so that the process will run an original logic of the physical GPU interface each time when using the physical GPU interface in future; and Step 5.3: ending the thread inserted into the process of binding the agent to the corresponding virtual machine, and unloading the agent.

12. The method as recited in claim 6, wherein the step of collecting the GPU conditions of the guest application coming from the physical GPU interface by the guest application GPU condition monitor comprises steps of:

Step 3.1: in a handler designated by the GPU resource scheduling algorithm, calling the physical GPU interface, an operating system kernel or an interface provided by a GPU driver; and according to requirements of the GPU resource scheduling algorithm and user commands, collecting the GPU conditions; and Step 3.2: in the handler designated by the GPU resource scheduling algorithm, calling the physical GPU interface.

13. The method as recited in claim 6, wherein the step of "generating GPU condition results of the guest application" comprises steps of:

Step 4.1: designating a condition reporting frequency by the user, and acquiring the condition reporting frequency in the agent;

Step 4.2: when reaching a predetermined condition reporting point, by the guest application GPU condition monitor in the agent, sending accumulative GPU condition results of the guest application to the scheduling communicator in the scheduling controller; and Step 4.3: emptying a GPU condition result buffer of the agent by the agent.

14. The method, as recited in claim 6, wherein the GPU resource scheduling algorithm comprises following steps of:

Step 6.1: for a group of virtual machines VM1, VM2 . . . to VMn, analyzing a user method configuration by the scheduler in the agent, and obtaining a minimum GPU load, minimum frames per second to be met, and a testing period T designated by the user;

Step 6.2: during operation, calling a handler multiple times; and for each call of the handler, executing Step 2.1a to Step 2.5a with the forecasting techniques; or executing Step 2.1b to Step 2.4b without the forecasting techniques;

Step 6.3: for each time period T, if a virtual machine VMm does not satisfy a condition measurement, finding and reducing a setting of minimum frames per second of a virtual machine having the maximum and minimum frames per second; wherein: a reduced magnitude of the frames per second depends on an application GPU load of the guest application for recent frames, and the frames per second and the application GPU load for the recent frames have a linear relation;

Step 6.4: for each time period T, if a utilization rate of the physical GPU fails to meet the minimum GPU load, increasing a setting of the minimum frames per second for all of the virtual machines; wherein an increased magnitude of the frames per second depends on the application GPU load of the guest application for the recent frames, and the frames per second and the application GPU load of the guest application for the recent frames have the linear relation; and Step 6.5: keep running Step 6.2 to Step 6.4 until the method designated by the user ends or the method is changed or the agent is unloaded.

15. The method, as recited in claim 7, wherein: if the mark flush frame is executed, the frame removed from the buffer is the marked frame.

* * * * *